United States Patent Office 2,898,049
Patented Aug. 4, 1959

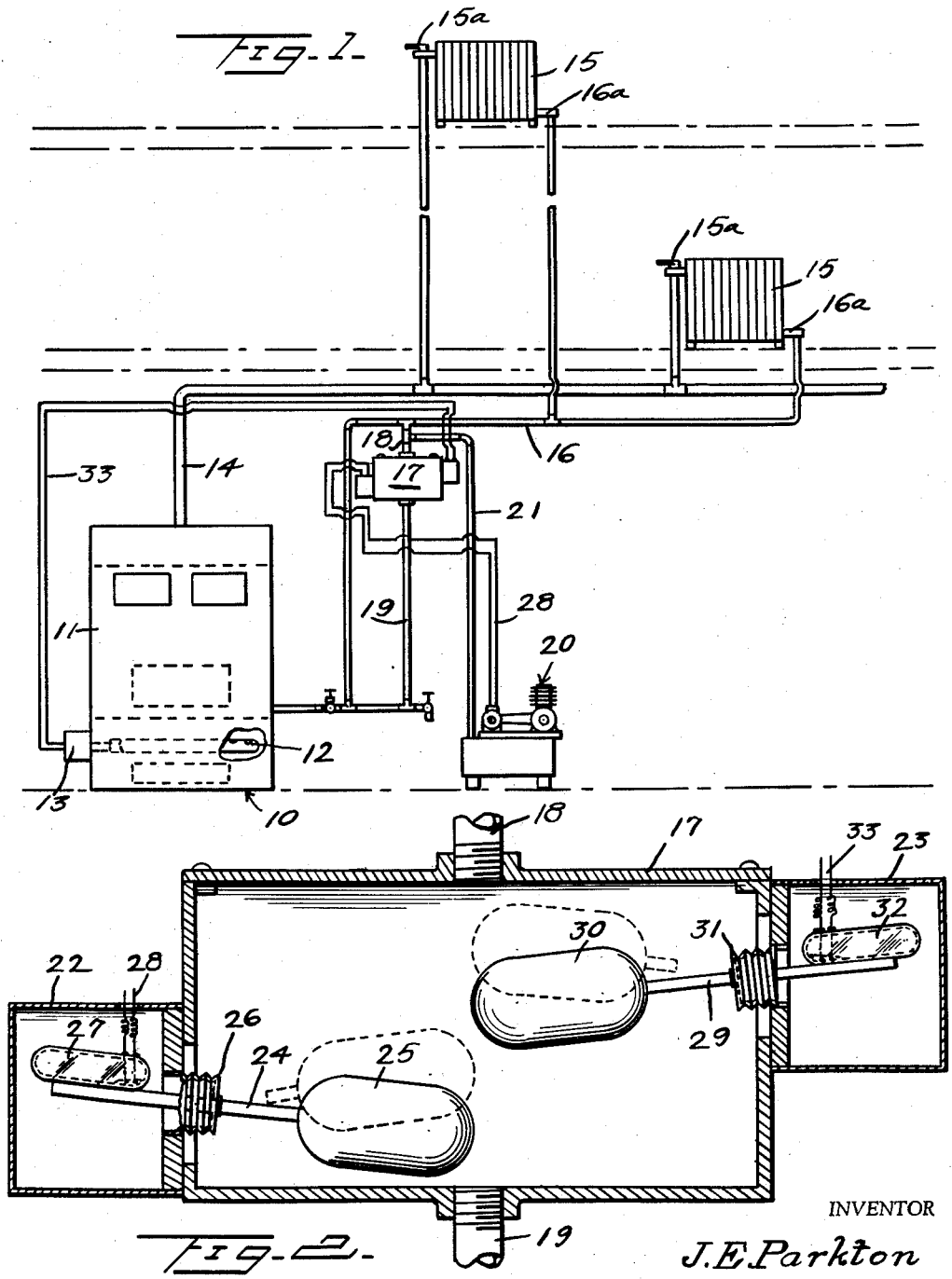

2,898,049
CONTROL FOR VACUUM HEATING SYSTEMS

James Edward Parkton, Clarks Summit, Pa., assignor to Parkton Compound Boiler Co., Inc., Clarks Summit, Pa., a corporation of Pennsylvania Application July 23, 1957, Serial No. 673,732

2 Claims. (Cl. 237—9)

The present invention relates to controls for vacuum heating systems, and more particularly to controls for vacuum heating systems of the kind illustrated in Patent No. 2,131,901, issued October 4, 1938.

The primary object of the invention is to provide a dual float control for actuating the vacuum pump and the burner of the heating system.

Another object of the invention is to provide a pair of floats arranged in vertically spaced relation in a single chamber for operation at varying levels of fluid in the chamber.

A still further object of the invention is to provide a dual float control system for vacuum heating systems which is inexpensive to manufacture, simple to install, and which is completely effective in its action.

Other objects and advantages will become apparent in the following specification when considered in the light of the attached drawings, in which:

Figure 1 is a semi-diagrammatic view of the vacuum heating system control.

Figure 2 is a vertical cross-section taken through the control chamber.

Referring now to the drawings in detail wherein like reference characters indicate like parts throughout the several figures, the reference numeral 10 indicates generally a vacuum heating system to which the invention is attached.

As in the aforementioned patent, the vacuum heating system 10 includes a low pressure boiler type furnace 11 having a burner 12 therein actuated by an electric unit 13. The burner 12 may be oil or gas and the unit 13 may be of any conventional operated control.

The furnace 11 has a steam or vapor feed line 14 extending therefrom and connected to the inlet side of radiators 15 through modulating valves 15a. A return line 16 is connected through thermos 16a to the return side of the radiators 15 and leads back to the furnace 11.

A float reservoir 17 has a pipe 18 connecting it to the return line 16 and a pipe 19 connecting it to another point along the return line 16 closer to the furnace 11. A vacuum pump 20 is connected by a pipe 21 to the pipe 18, as illustrated in Figure 1.

The float reservoir 17 has a pair of switch chambers 22, 23 secured thereto on opposite sides thereof and vertically spaced thereon. A float arm 24 has a float 25 mounted on one end thereof and extends through the side of the reservoir 17 into the switch chamber 22. The float arm 24 is sealed by a diaphragm bellows 26 and has a mercury switch 27 mounted on the end thereof within the switch chamber 22.

Leads 28 extend to the vacuum pump 20 so as to energize the vacuum pump 20 when the float 25 is in its lowermost position.

The float arm 24 is positioned near the bottom of the reservoir 17 and a second float arm 29 extends through the opposite side of the reservoir 17 adjacent the top thereof extending through the end wall of the reservoir 17 into the switch chamber 23.

The float arm 29 has a float 30 mounted on its inner end and is sealed by a diaphragm bellows 31 at its exit from the reservoir 17. A mercury switch 32 is secured to the outer end of the float arm 29 in the switch chamber 23 and has connected thereto a pair of leads 33 extending to the control 13 of the furnace burner 12. The burner 12 is energized when the float 20 is in its lowermost position.

In the use and operation of the invention, presume that the reservoir 17 is empty, with the floats 25 and 30 both in their lowermost position, and the house thermostat (not shown) set to energize the burner 12.

Under these conditions, the burner 12 and the vacuum pump 20 both begin to operate and the pressure in line 14 and radiators 15 begins to increase. Under the assumption that the vacuum pump 20 pumps air out of the return line 16 faster than it is being released from the radiators 15, the water line will rise in reservoir 17 raising the float 25.

As the float 25 is raised, the switch 27 is tilted to open the circuit between the leads 28, stopping the vacuum pump 20. As the air continues to flow from radiators 15 into the return line 16, the water line in the reservoir 17 will drop causing the float 25 to lower to close the contacts of the switch 27 and again actuate the vacuum pump 20.

When the air is all drawn from radiators 15 and the pressure or vacuum remains constant in return 16, the water line in reservoir 17 will remain steady with the vacuum pump 20 off and the burner 12 on. Should the burner 12 produce steam or vapor faster than the radiators 15 can consume same, the pressure in the furnace 11 increases and creates greater resistance to condensate returning to furnace by gravity.

This condition causes water line in reservoir 17 to rise sufficiently to raise the float 30 opening the circuit in the switch 32 and deenergizing the burner 12. This, of course, will stop the production of steam and as soon as the steam already produced is consumed, the pressure in the furnace 11 drops allowing the condensate to flow into the furnace 11 thus permitting the water line in the reservoir 17 to drop with a simultaneous drop of the float 30 to close the switch 32 and again start the burner 12 in operation.

The dual float reservoir 17 serves to control both the vacuum pump 20 and the burner 12 from a single source of water height measurement without undue expense.

Having thus described the preferred embodiment of the invention, it should be understood that numerous structural modifications and adaptations may be resorted to without departing from the scope of the appended claims.

What is claimed is:

1. In a vacuum heating system of the type including a furnace, a burner in said furnace, radiators, a steam line connecting said furnace to said radiators, a return line connecting said radiators to said furnace and a control reservoir connected in said return line in constant communication with said return line, an upper float positioned in said control reservoir, a lower float positioned in said control reservoir spaced below said upper float, switch control means secured to said upper float and electrically connected to said burner to effect operation of said burner with said upper float in its lowermost position, a vacuum pump connected to said return line and switch control means secured to said lower float and electrically connected to said vacuum pump to interrupt operation of said vacuum pump with said lower float in its uppermost position.

2. A device as claimed in claim 1 wherein said floats are positioned so that the uppermost position of said lowermost float and the lowermost position of said uppermost float are vertically spaced apart whereby with varying levels of fluid in said reservoir both of said switch control means may be in closed position, both in open position and the upper in closed position with the lower in open position.

References Cited in the file of this patent

UNITED STATES PATENTS

| | | |
|---|---|---|
| 2,131,901 | Parkton | Oct. 4, 1938 |
| 2,707,459 | Swaney | May 3, 1955 |

FOREIGN PATENTS

| | | |
|---|---|---|
| 661,134 | Great Britain | Nov. 14, 1951 |